United States Patent [19]
Frazier

[11] 3,792,421
[45] Feb. 12, 1974

[54] UNDERWATER DATA TRANSMISSION SYSTEM

[75] Inventor: Larry Vane W. Frazier, Ventura, Calif.

[73] Assignee: The United States of America as represented by the Secretary of the Navy, Washington, D.C.

[22] Filed: July 12, 1972

[21] Appl. No.: 270,878

[52] U.S. Cl. .................. 340/4 R, 9/8 R, 114/206 R
[51] Int. Cl. ............................................. B63b 21/00
[58] Field of Search ...... 340/2, 3 T, 16 C, 5 R, 4 R; 114/206 R; 9/8 R

[56] References Cited
UNITED STATES PATENTS

| | | | |
|---|---|---|---|
| 3,130,703 | 4/1964 | Thompson | 114/206 R |
| 3,499,411 | 3/1970 | Savoie | 9/8 R |
| 3,066,325 | 12/1962 | Hayes | 9/8 R |
| 3,654,649 | 4/1972 | Richardson | 114/206 R |

*Primary Examiner*—Richard A. Farley
*Attorney, Agent, or Firm*—Richard S. Sciascia; Joseph M. St. Amand

[57] ABSTRACT

The present invention is a method for raising and lowering an umbilical cable into which other cables could be plugged, the cable being retrieved by releasing a connector through a signal sent on the cable. This allows the messenger cable to float to the surface, and after servicing the cable is equipped again with a releasable weight and allowed to fall to the ocean floor.

1 Claim, 3 Drawing Figures

UNDERWATER DATA TRANSMISSION SYSTEM

BACKGROUND OF THE INVENTION

1. Field of the Invention

The present invention relates to an underwater transmission system and more precisely the invention relates to a method of raising and lowering a transmission cable in order that maintenance may be performed and other cables plugged therein.

2. Description of the Prior Art

The technical problem of transmission with a deeply submerged cable is relatively simple. However, keeping the cable portable easily deployable, retrievable and maintainable is of very great concern. Meeting such requirements has until now presented a highly complex problem.

In order to maintain the flexibility noted above the present concept was devised for raising and lowering an umbilical cable into which other calbes such as the Navy's ambient noise and data system could be plugged. The original concept was to employ some combination of float and winch for raising and lowering the cable. The expense, complexity and lack of reliability of a winch operated at very deep depths did not favor such an approach.

SUMMARY OF THE INVENTION

This invention involves the raising and lowering from deep ocean depths of an umbilical cable into which other cables may be plugged. In operation, a weight release attached to a messenger line is activated by a signal through the cable. A float carries the messenger line to the surface. A second weight release is activated and a float also carries the necessary equipment along with the signal cable to the surface.

After servicing a weight is attached to the signal cable via the second weight release and the cable float and equipment are dropped to the bottom. Another weight is attached to the messenger line via the weight release and the float and messenger line are allowed to fall free to the bottom. Thus the system is ready for use and is cocked for removal to the surface in the event of needed maintenance.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
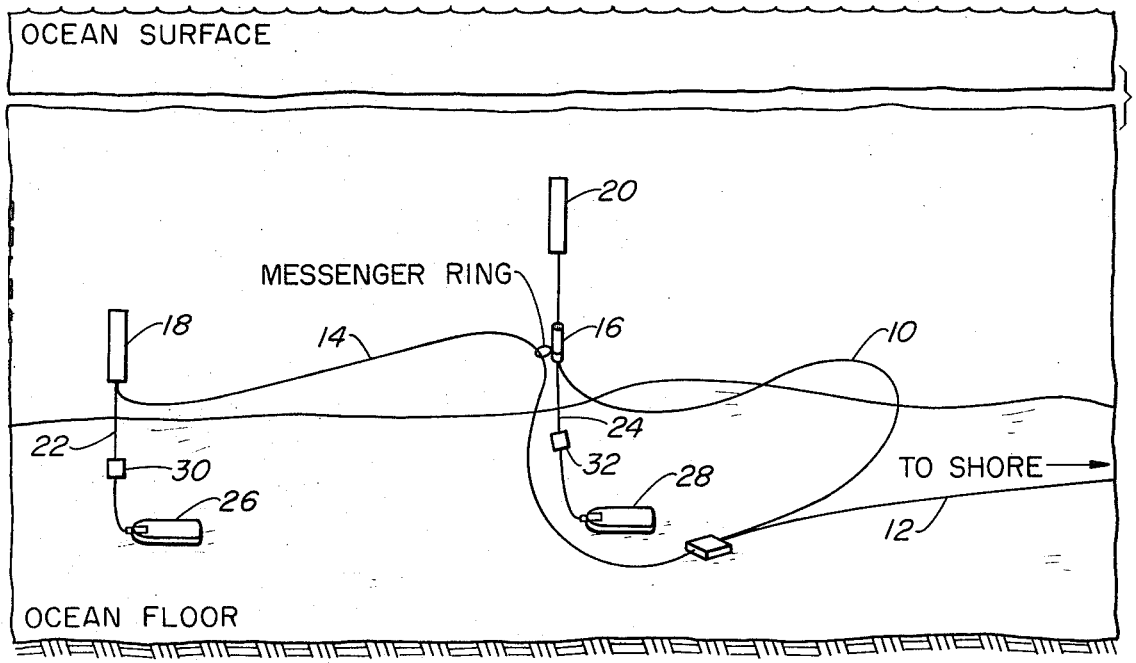
FIG. 1 is a schematic view showing the cable positioned on the ocean bottom with the weight release and floats attached thereto.
Figure 2:
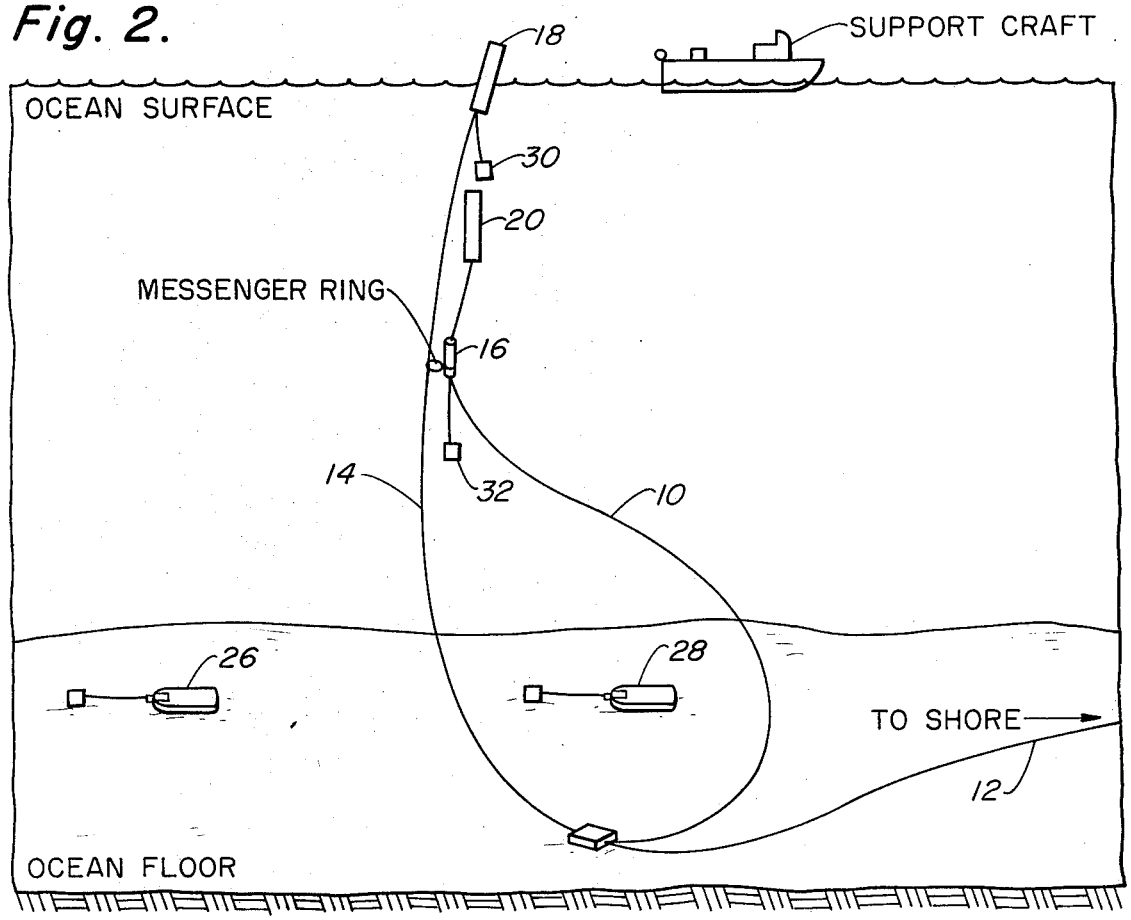
FIG. 2 is a schematic view showing the manner in which the cable and equipment are floated to the ocean surface.

The present invention involves the raising and lowering from deep ocean depths of an umbilical cable into which other cables may be plugged including the ambient noise and data system cable now in extensive Navy use. As illustrated in FIG. 1, the signal cable 10, control cable 12, and messenger cable 14, as well as attached instrumentation including the hydrophone 16 are in place on the ocean floor.

The buoyant floats 18 and 20 are attached to the messenger cable 14 and signal cable 10 respectively with each float being connected by lines 22 and 24 to a pair of releasable weights 26 and 28.

The electro-mechanical weight release devices 30 and 32 are interposed between each float and each weight and are connected on the lines 22 and 24 as shown.

If a need arises for replacing the hydrophone 16 or servicing any of the various cables, the weight release 30 is activated by an appropriate signal through the signal, control and messenger cables 10, 12 and 14, respectively. The buoyant float 18 being released from weight 26 carries the messenger cable 14 to the surface. Weight release 32 is then activated by an appropriate signal through signal and control cables 10 and 12 and float 20 is released from weight 28. The signal cable 10 and attached hydrophone 16 are carried by float 20 to the ocean surface.

Figure 3:
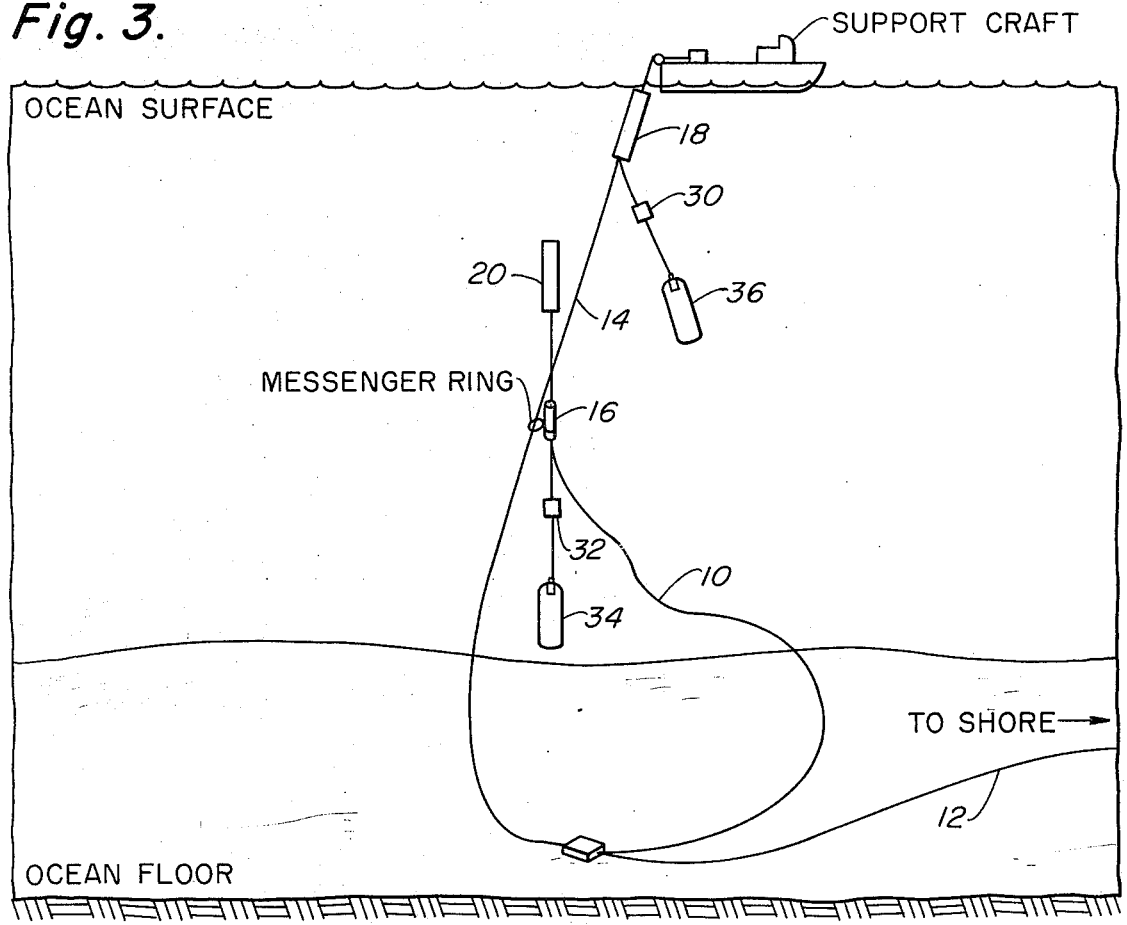
FIG. 3 is also a schematic view and shows the serviced cable and equipment being re-implanted on the ocean floor.

As shown in FIG. 3, the hydrophone 16 or other cable structure has been serviced and is in the process of being re-implanted on the ocean bottom. A separate weight 34 is attached to the signal cable via the electro-mechanical weight release 32 and said signal cable 10 with attached float 20, weight 34 and hydrophone 16 are allowed to fall to the ocean bottom.

Another weight 36 is attached to the messenger cable via the electro-mechanical weight release 30 and attached float 18. The messenger cable 14 with float 18 and weight 36 are then also allowed to fall free to the ocean bottom. The system is again ready for use and is cocked for recycling to the ocean surface in the event of future needed maintenance.

Obviously, many modifications and variations of the present invention are possible in the light of the above teachings. It is therefore to be understood that within the scope of the appended claims the invention may be practiced otherwise than as specifically described.

What is claimed is:

1. A system for raising and lowering an umbilical cable in deep water for servicing comprising:
    a weight attached to said cable for lowering and retaining said cable on the ocean floor;
    an electro-mechanical release interposed between said cable and said weight;
    means for actuating said electro-mechanical release to separate the weight from said cable;
    a float attached to said cable adapted to raise the cable when the weight is released;
    a messenger cable attached to said umbilical cable for guiding it to and from the ocean floor; said messenger cable attached to said umbilical cable through a messenger ring;
    a weight attached to said messenger cable for lowering and retaining it on the ocean floor;
    an electro-mechanical release interposed between said messenger cable and said weight; said messenger cable adapted to transmit a signal to the electro-mechanical release to separate the weight; and
    a float attached to said messenger cable adapted to raise it when said weight is released.

* * * * *